(12) United States Patent
Ashizawa

(10) Patent No.: US 6,539,287 B1
(45) Date of Patent: Mar. 25, 2003

(54) DISTRIBUTION CONTROL SYSTEM CAPABLE OF ISOLATING FAULT SECTION WITHOUT USING TIME LIMITED SEQUENTIAL SHIFT FUNCTION

(75) Inventor: Tomoo Ashizawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,642

(22) Filed: Oct. 25, 1999

(30) Foreign Application Priority Data

May 19, 1999 (JP) ............................................ 11-138443

(51) Int. Cl.[7] ........................ G05D 11/00; G05D 17/00; G05D 3/12; G05D 5/00; G05D 9/00
(52) U.S. Cl. ........................ 700/292; 700/22; 700/293; 361/59; 361/63; 361/67; 361/71; 361/93.1
(58) Field of Search .......................... 700/22, 292, 293; 714/8; 702/58, 185; 361/59, 62–64, 71–75

(56) References Cited

U.S. PATENT DOCUMENTS

| 3,970,898 A | * | 7/1976 | Baumann et al. | ............ 361/68 |
|---|---|---|---|---|
| 4,328,551 A | * | 5/1982 | Yamaura et al. | ............ 700/292 |
| 4,672,501 A | * | 6/1987 | Bilac et al. | ............ 361/96 |
| 5,185,705 A | * | 2/1993 | Farrington | ............ 361/115 |
| 5,237,511 A | * | 8/1993 | Caird et al. | ............ 700/293 |
| 5,513,061 A | * | 4/1996 | Gelbien et al. | ............ 361/63 |
| 6,160,690 A | * | 12/2000 | Matsumoto et al. | ............ 361/62 |
| 6,175,479 B1 | * | 1/2001 | Boyd et al. | ............ 361/96 |
| 6,275,366 B1 | * | 8/2001 | Gelbien et al. | ............ 361/115 |

OTHER PUBLICATIONS

Taiwan Electric Power Public Corporation "Technical Specifica–tion", Dec. 1994.

* cited by examiner

*Primary Examiner*—Thomas Black
*Assistant Examiner*—Crystal J Barnes
(74) *Attorney, Agent, or Firm*—Leydig, Voit & Mayer, Ltd.

(57) ABSTRACT

A distribution control system includes in each of feeder terminal units a controller that updates a value in a latest current value storage area of a memory, every time a current value is detected at a sampling interval. If a distribution line fault takes place, that is, if the detected current value exceeds a reference value, each controller stores the current value in a fault current value storage area of the memory as a fault current value. The feeder terminal units each supply the information about the fault current to a control center through a substation remote terminal unit so that the control center identifies a fault section from the information for detecting the fault section.

6 Claims, 7 Drawing Sheets

DISTRIBUTION CONTROL SYSTEM CAPABLE OF ISOLATING FAULT SECTION WITHOUT USING TIME LIMITED SEQUENTIAL SHIFT FUNCTION

BACKGROUND OF THE INVENTION

1. Field of the Invention

The present invention relates to a distribution control system for identifying and isolating a fault section when a fault takes place on a distribution line.

2. Description of Related Art

FIG. 7 is a diagram showing a distribution system. In FIG. 7, reference symbols AS/S, BS/S, CS/S, DS/S and ES/S each designate a distribution substation; F1–F9 each designate a distribution line led out of the distribution substation AS/S; F10–F18 each designate a distribution line led out of the distribution substation BS/S; F19–F26 each designate a distribution line led out of the distribution substation CS/S; F27–F34 each designate a distribution line led out of the distribution substation DS/S; F35–F43 each designate a distribution line led out of the distribution substation ES/S; and LS1–LS18 each designate a tie switch for coupling two distribution lines. Although not shown in FIG. 7, a plurality of load break switches are interposed in each distribution line.

FIG. 8 is a block diagram showing a conventional distribution control system, in which the reference numeral 1 designates a distribution transformer of the distribution substation AS/S; 2 designates a secondary main breaker of the distribution transformer 1; and 3 designates a secondary main bus of the distribution transformer 1, from which the distribution lines F1 and F2 are drawn out.

Reference numerals 4 and 5 each designate a distribution feeder breaker; 6–11 each designate a no-voltage opened mode load break switch connecting in series two respective sections of the distribution lines F1 and F2, distribution line F1 including sections F1-1, F1-2, F1-3, and F1-4 and distribution line F2 including sections F2-1, F2-2, F2-3, and F2-4; 12 designates a tie switch for coupling the distribution lines F1 and F2; 13–19 each designate a feeder terminal unit for monitoring a fault current or the like passing through one of the load break switches 6–11 and tie switch 12, for notifying a substation remote terminal unit 20 of presence/absence information about the fault current, and for turning on and off the load break switches 6–11 and tie switch 12 in response to a control signal fed from the substation remote terminal unit 20; and 20 designates the substation remote terminal unit for transferring to a control center 21 the presence/absence information about the fault current supplied from the feeder terminal units 13–19, and for transferring to the feeder terminal units 13–19 the control signal supplied from the control center 21.

The reference numeral 21 designates the control center for managing the distribution of the distribution substation AS/S; 22 designates an information collecting unit for carrying out transmission and reception of information; 23 designates a computer system for identifying a fault section from the presence/absence information supplied thereto, and for producing the control signal commanding to open the load break switches at both ends of the fault section; and A1–A5, B1–B3 and C each designate a communication line.

FIG. 9 is a block diagram showing an internal arrangement of each of the load break switches 6–11 and feeder terminal units 13–18. In FIG. 9, the reference numeral 31 designates a contact maker; 32 designates an operation rod for making or breaking the contact maker 31; 33 designate an actuator of each of the load break switches 6–11; 34 designates a current transformer for detecting a current flowing through the distribution line on the power supply side; 35 designates a control transformer for detecting a voltage on the distribution line on the power supply side; and 36 designates a control transformer for detecting a voltage on the distribution line on the load side.

The reference numeral 37 designates a voltage/phase angle detector connected to the control transformers 35 and 36 for detecting the voltage and phase on the distribution line; 38 designates a current detector connected to the current transformer 34 for detecting the current passing through each of the load break switches 6–11; 39 designates a controller for monitoring an operation state of the switch actuator 33 and the current passing through each of the load break switches 6–11, and for controlling the switch actuator 33 in response to the control signal fed from the substation remote terminal unit 20; 40 designates a communication circuit for exchanging with the substation remote terminal unit 20 various information (such as values detected by the voltage/phase angle detector 37 and current detector 38); 41 designates a battery for supplying power to component circuits of each of the feeder terminal units 13–18 in case of outage of the distribution line; and 42 designates a branch box for connecting the communication circuit 40 of each of the feeder terminal units 13–18 to a communication line.

Next, the operation of the conventional system will be described.

When controlling the distribution system of the distribution substation AS/S, the substation remote terminal unit 20 regularly transmits to the feeder terminal units 13–19 an information transmission request through the communication lines A4 and A5 so as to collect information about the load break switches 6–11 and tie switch 12 (including the presence/absence information of the fault current passing through the load break switches 6–11).

On the other hand, the feeder terminal units 13–19 always collect information about the load break switches 6–11 and tie switch 12, and send the information back to the substation remote terminal unit 20 through the communication lines A4 and A5 in response to the information transmission request sent from the substation remote terminal unit 20.

The information about the load break switches 6–11 and tie switch 12 thus collected by the substation remote terminal unit 20 is transferred to the control center 21. Thus, the information collecting unit 22 in the control center 21 receives the information, and the computer system 23 in the control center 21 identifies the fault section from the information about the load break switches 6–11 and tie switch 12 if a distribution line fault takes place.

Identifying the fault section, the computer system 23 in the control center 21 supplies the substation remote terminal unit 20 with a control signal that commands it to open the load break switches at both ends of the fault section. In response to the control signal, the substation remote terminal unit 20 transfers, to the feeder terminal units managing the load break switches at both ends of the fault section, the control signal commanding to open the load break switches. Thus, the feeder terminal units open the load break switches.

An example will now be described assuming that a distribution line fault takes place in the section F1-3 of the distribution line F1 as shown in FIG. 8.

If a distribution line fault takes place in the section F1-3 of the distribution line F1, a protective relay not shown in FIG. 8 but included in the feeder breaker 4 operates so that the feeder breaker 4 trips and the distribution line F1 is shut down. However, since the load break switches 6–8 are a no-voltage opened mode switch, they open immediately when the distribution line F1 is shut down to a no-voltage state by the distribution line fault.

Counting about 60 seconds after breaking the distribution line F1, the feeder breaker 4 automatically closes again by the operation of an embedded reclosing relay. Accordingly, the power is supplied to the section F1-1, that is, to the power supply side of the load break switch 6. After elapsing about seven seconds, the load break switch 6 automatically closes again so that the power is supplied to the section F1-2, that is, to the power supply side of the load break switch 7. Likewise, after elapsing about seven seconds, the load break switch 7 automatically closes so that the power is supplied to the section F1-3.

If the fault taking place in the section F1-3 is a transitory failure, the section F1-3 will have already been recovered when the load break switch 7 automatically closes. Thus, the distribution line F1 is recovered from the fault. Such a method that sequentially closes the load break switches when a distribution line fault occurs is referred to as a time limited sequential shift method.

On the other hand, if the fault taking place in the section F1-3 is a continuous failure, it will reoccur when the load break switch 7 automatically closes. Thus, the feeder breaker 4 trips again, and the load break switches 6 and 7 open automatically. In response to the fault immediately after the automatic closing, the load break switch 7 considers the section F1-3, one of the load side sections of the load break switch 7, as a fault section, and enters a closing lock mode.

Then, the feeder breaker 4 closes once again after the reoccurrence of the fault so that the power is sequentially applied to the sections F1-1 and F1-2. In this case, since the load break switch 7 is not closed because of the closing lock mode, the time limited sequential shift is completed when it reaches the section F1-2.

Then, the computer system 23 in the control center 21, receiving the information about the load break switches 6–8 from the feeder terminal units 13–15 through the substation remote terminal unit 20, recognizes that because the load-break switch 6 is in the close state and the load break switches 7 and 8 are in the open state, the section F1-3 between the load break switches 7 and 8 in the open state is a fault section.

Identifying the fault section in this way, the computer system 23 supplies the substation remote terminal unit 20 with the control signal commanding to open the load break switches 7 and 8. Receiving the control signal, the substation remote terminal unit 20 transfers the control signal to the feeder terminal units 14 and 15 to open the load break switches 7 and 8 at both ends of the fault section F1-3, thereby isolating the fault section.

After isolating the fault section F1-3, the computer system 23 supplies the substation remote terminal unit 20 with the control signal commanding to turn on the tie switch 12 to recover the outage of the health section (the section F1-4 in this case). Receiving the control signal, the substation remote terminal unit 20 transfers the control signal to the feeder terminal unit 19 which closes the tie switch 12. Thus, the health section F1-4 is recovered from the outage.

With the foregoing configuration, the conventional distribution control system can positively isolate the fault section from the health sections using the time limited sequential shift method. However, when the distribution line equipment such as the load break switches 6–11 cannot handle the time limited sequential shift method, a problem arises in that it is necessary to install into the distribution line equipment a device for detecting a fault section.

SUMMARY OF THE INVENTION

The present invention is implemented to solve the foregoing problem. It is, therefore, an object of the present invention to provide a distribution control system capable of identifying and isolating a fault section, without employing the time limited sequential shift method and without adding any new devices, by storing in feeder terminal units current values passing through the load break switches when a fault occurs, and by using the fault current values that are stored.

According to one aspect of the invention, a distribution control system for controlling switches, each switch connecting sections of at least one distribution line to a breaker, the distribution control system includes switch controllers, each of the switch controllers controlling an open/close state of one of the switches, and storing, when making a decision that a current passing through the corresponding switch is a fault current, a value of the current as a fault current value; and fault section identifying means for identifying a fault section from the fault current value stored in the switch controllers and generating a clear command to clear a fault current value stored in the switch controllers, wherein each of the switch controllers clears the fault current value stored in response to the clear command.

According to another aspect of the invention, a distribution control system for controlling switches, each switch connecting sections of at least one distribution line to a breaker, the distribution control system includes switch controllers, each of the switch controllers controlling an open/close state of one of the switches, and storing, when making a decision that a current passing through the corresponding switch is a fault current, a value of the current as a fault current value; and fault section identifying means for identifying a fault section from the fault current value stored in the switch controllers, each of the switch controllers clearing the fault current value after a time period elapses following storing of the fault current value.

According to a third aspect of the invention, a distribution control system for controlling switches, each switch connecting sections of at least one distribution line to a breaker, the distribution control system includes switch controllers, each of the switch controllers controlling an open/close state of one of the switches, and storing, when making a decision that a current passing through the corresponding switch is a fault current, a value of the current as a fault current value; and fault section identifying means for identifying a fault section from the fault current value stored in the switch controllers and for identifying, when the breaker trips, the fault section only from fault current values stored in the switch controllers associated with the switches in the distribution line connected to the breaker.

DETAILED DESCRIPTION OF THE PREFERRED EMBODIMENTS

The invention will now be described with reference to the accompanying drawings.

Embodiment 1

Figure 1:
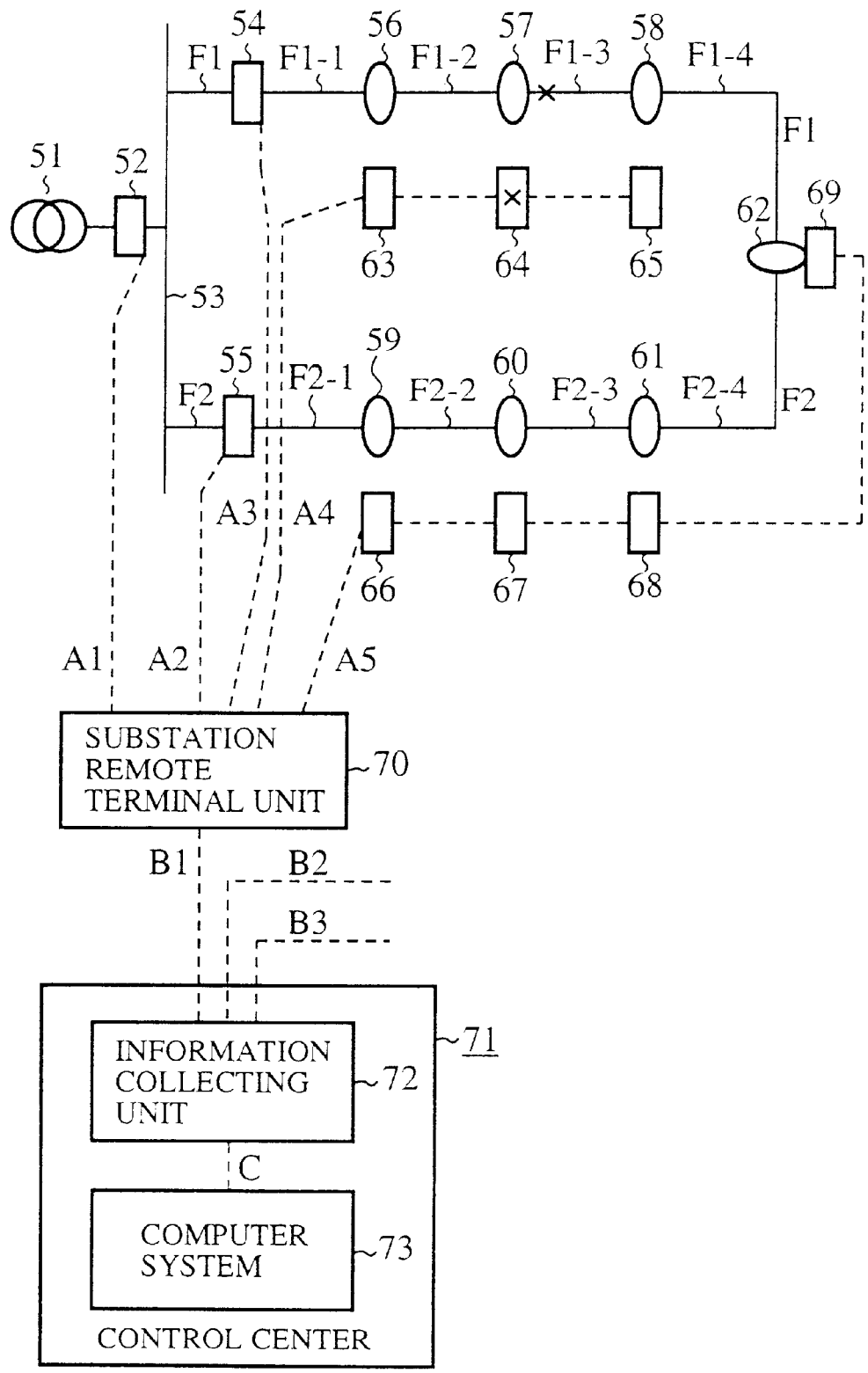
FIG. 1 is a block diagram showing a configuration of an embodiment 1 of a distribution control system in accordance with the present invention.

FIG. 1 is a block diagram showing an embodiment 1 of a distribution control system in accordance with the present invention. In FIG. 1, the reference numeral 51 designates a distribution transformer of the distribution substation AS/S; 52 designates a secondary main breaker of the distribution transformer 51; and 53 designates a secondary main bus of the distribution transformer 51, from which the distribution lines F1 and F2 are drawn out.

Reference numerals 54 and 55 each designate a distribution feeder breaker respectively controlling current flowing to the distribution lines F1 and F2, the distribution line F1 including sections F1-1, F1-2, F1-3, and F1-4 and the distribution line F2 including sections F2-1, F2-2, F2-3, and F2-4; 56–61 each designate a no-voltage unopened mode load break switch connecting two respective contiguous sections of one of the distribution lines F1 and F2; 62 designates a tie switch for coupling the distribution lines F1 and F2; and 63–69 each designate a feeder terminal unit for monitoring a fault current or the like passing through the load break switches 56–61 and tie switch 62, for storing presence/absence information about the fault current and the like in an embedded memory, for notifying a substation remote terminal unit 70 of the information, and for turning on and off the load break switches 56–61 and tie switch 62 in response to a control signal fed from the substation remote terminal unit 70.

The reference numeral 70 designates the substation remote terminal unit for transferring to a control center 71 the presence/absence information about the fault current and the like supplied from the feeder terminal units 63–69, and for transferring to the feeder terminal units 63–69 the control signal supplied from the control center 71.

The reference numeral 71 designates the control center for managing the distribution of the distribution substation AS/S; 72 designates an information collecting unit for carrying out transmission and reception of predetermined information; 73 designates a computer system for identifying a fault section from the presence/absence information about the fault current, and for producing a control signal commanding to open the load break switches at both ends of the fault section; and A1–A5, B1–B3 and C each designate a communication line.

Figure 2:
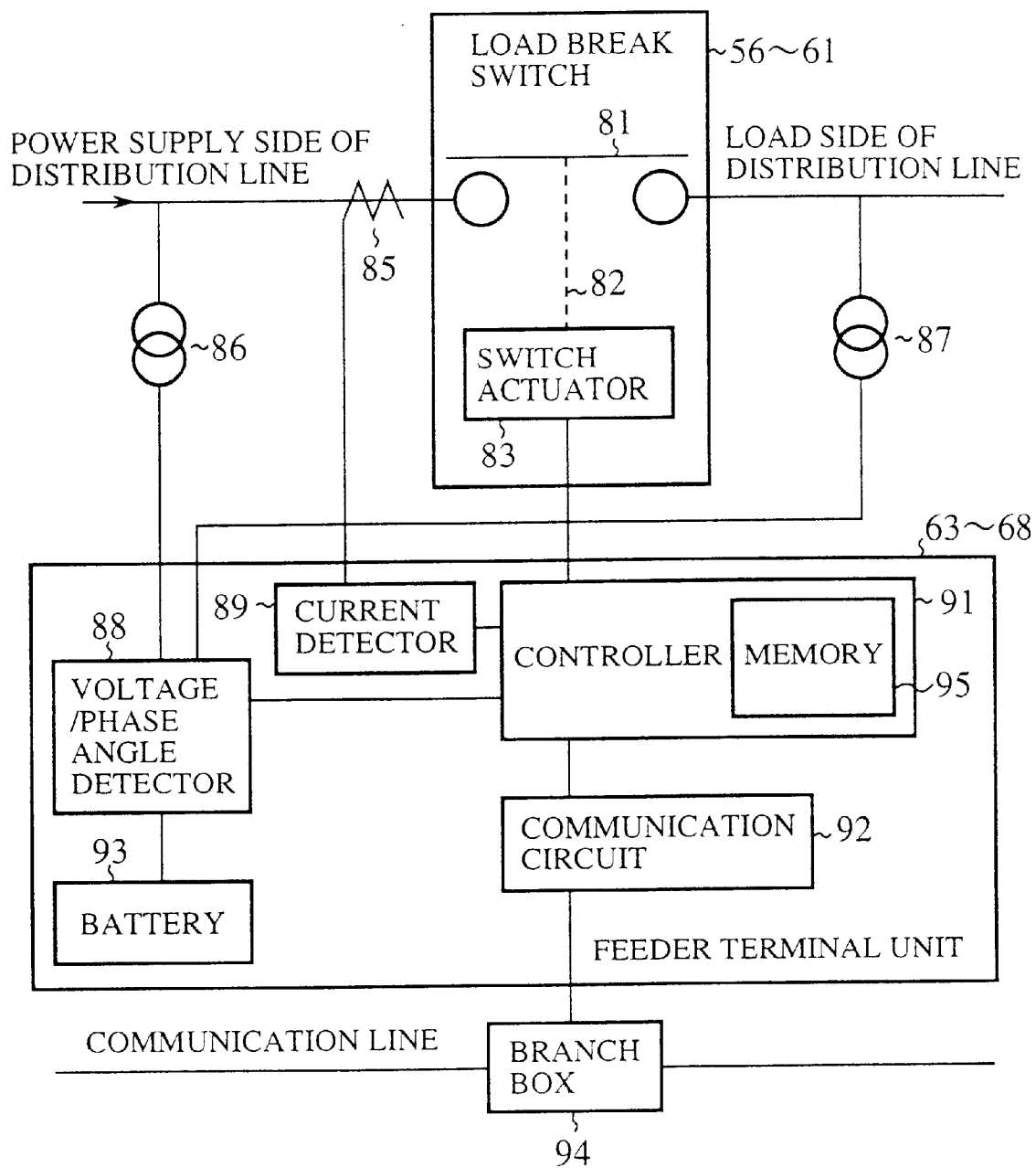
FIG. 2 is a block diagram showing a configuration of a load break switch and a feeder terminal unit.

FIG. 2 is a block diagram showing an internal arrangement of each of the load break switches 56–61 and feeder terminal units 63–68. In FIG. 2, the reference numeral 81 designates a contact maker; 82 designates an operation rod for making or breaking the contact maker 81; 83 designate an actuator of each of the load break switches 56–61; 85 designates a current transformer for detecting a current flowing through the distribution line on the power supply side; 86 designates a control transformer for detecting a voltage on the distribution line on the power supply side; and 87 designates a control transformer for detecting a voltage on the distribution line on the load side.

The reference numeral 88 designates a voltage/phase angle detector connected to the control transformers 86 and 87 for detecting the voltages and phases of the distribution line; 89 designates a current detector connected to the current transformer 85 for detecting a current passing through each of the load break switches 56–61; and 91 designates a controller for monitoring an operation state of the switch actuator 83 and the current passing through each of the load break switches 56–61, and for controlling the switch actuator 83 in response to the control signal fed from the substation remote terminal unit 70. The reference numeral 95 in the controller 91 designates the memory for storing a current value and fault current value detected at every time point.

The reference numeral 92 designates a communication circuit for exchanging with the substation remote terminal unit 70 various information (such as values detected by the voltage/phase angle detector 88 and current detector 89); 93 designates a battery for supplying power to component circuits of the feeder terminal units 63–68 in case of outage of the distribution line; and 94 designates a branch box for connecting the communication circuit 92 of each of the feeder terminal units 63–68 to a communication line.

Next, the operation of the present embodiment 1 will be described.

When controlling the distribution system of the distribution substation AS/S, the substation remote terminal unit 70 regularly transmits to the feeder terminal units 63–69 an information transmission request through the communication lines A4 and A5 so as to collect information about the load break switches 56–61 and tie switch 62 (such as the presence/absence information on the fault current passing through the load break switches).

Figure 3:
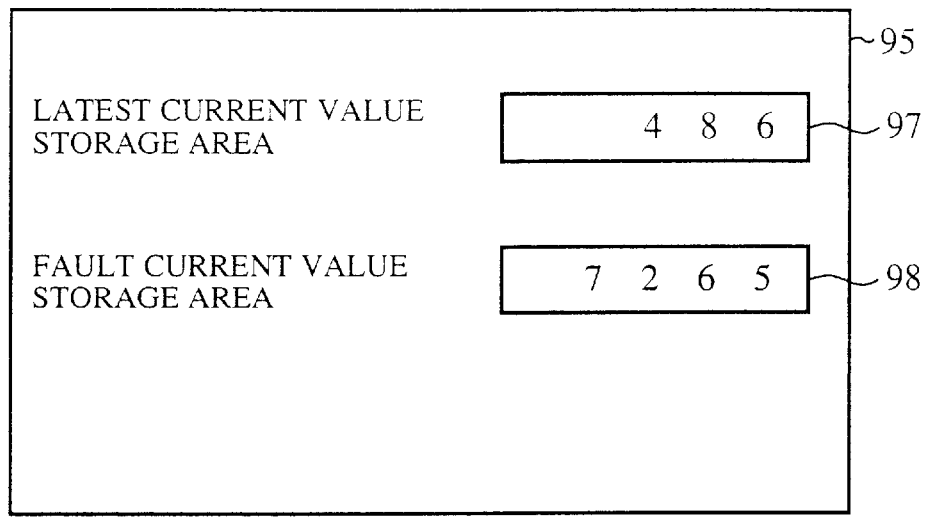
FIG. 3 is a diagram illustrating contents stored in a memory of the embodiment 1.

On the other hand, the feeder terminal units 63–69 always collect the information about the load break switches 56–61 and tie switch 62. In each of the feeder terminal units 63–69, the controller 91 carries out the A/D conversion of the analog current value detected by the current detector 89, and stores the digital value into the embedded memory 95 every time it is detected. If a distribution line fault takes place, the controller 91 stores the current value at that occasion as a fault current value. FIG. 3 illustrates an example of the contents stored in the memory 95 of the embodiment 1. In FIG. 3, the reference numeral 97 designates a latest current value storage area, the value in which is updated by the latest current value detected; and 98 designates a fault current value storage area for storing the current value at the time when a fault takes place. The controller 91 updates the value in the latest current value storage area 97 in the memory 95 with the current value detected at every predetermined sampling interval. If the current value detected exceeds a predetermined reference value, that is, if a distribution line fault takes place, the controller 91 stores that current value into the fault current value storage area 98 as the fault current value. In other words, the latest current value storage area 97 of the memory 95 sequentially stores the current value at each moment, and the fault current value storage area 98 stores only the current value at the fault.

Then, in response to the information transmission request sent from the substation remote terminal unit 70, each of the feeder terminal units 63–69 transmits to the substation remote terminal unit 70 through the communication lines A4 and A5 the values stored in the latest current value storage area 97 and fault current value storage area 98 of the memory 95 as the information about the load break switches 56–61 and tie switch 62.

The substation remote terminal unit 70 thus collects the information about the load break switches 56–61 and tie switch 62, and transfers the information to the control center 71. Thus, the information collecting unit 72 in the control center 71 receives the information. If a distribution line fault takes place, the information that the feeder breaker 54 interrupts because of the distribution line fault is transferred to the computer system 73 in the control center 71. The computer system 73 recognizes the occurrence of the distribution line fault, and identifies the fault section from the values in the fault current value storage areas 98 of the memories 95 stored as the information about the load break switches 56–61 and tie switch 62. Then, the computer system 73 supplies the feeder terminal units at both ends of the fault section with a command to open the load break switches through the substation remote terminal unit 70, thereby isolating the fault section.

According to the present embodiment 1, the feeder terminal units each store the current value passing through the associated load break switch when the fault takes place, and the control center 71 identifies the fault section from the fault current values stored, and isolates the fault section. This makes it possible for the controller 71 to collect, even if it cannot collect the fault current values at the time when the fault takes place, the fault current values immediately afterward, thus offering an advantage of being able to identify and isolate the fault section without employing the time limited sequential shift method.

Embodiment 2

The present embodiment 2 of the distribution control system in accordance with the present invention varies the scheme of storing the fault currents in the foregoing embodiment 1 of the distribution control system. Since the configuration of the system is the same as that of the embodiment 1 (FIG. 1), description thereof is omitted here.

The operation of the present embodiment 2 will now be described.

The feeder terminal units 63–69 always collect the information about the load break switches 56–61 and tie switch 62. In each of the feeder terminal units 63–69, the controller 91 carries out the A/D conversion of the analog current value detected by the current detector 89, and stores the digital value into the embedded memory 95 every time it is detected. If a distribution line fault takes place, each controller 91 stores the current value at that occasion as a fault current value.

Figure 4:
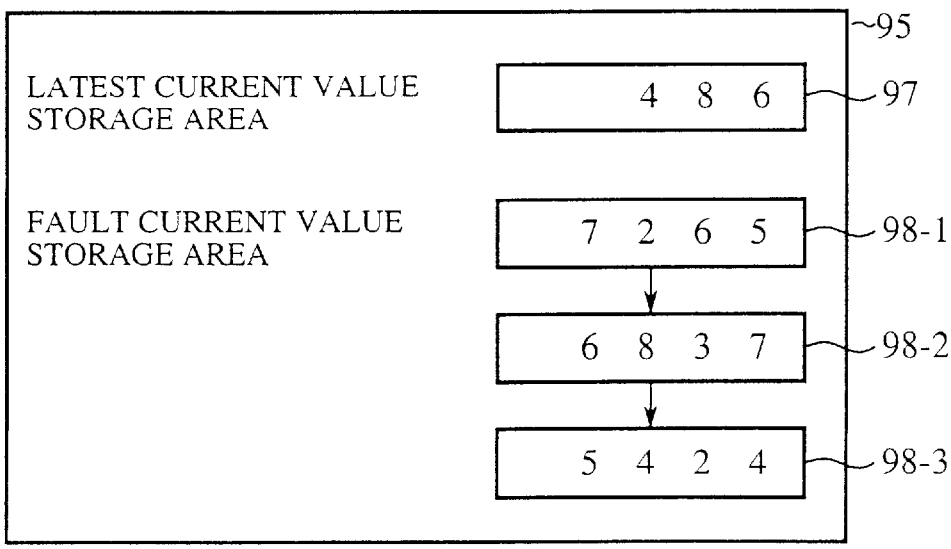
FIG. 4 is a diagram illustrating contents stored in a memory of an embodiment 2.

FIG. 4 illustrates an example of the contents stored in the memory 95 in the present embodiment 2. In FIG. 4, the reference numeral 97 designates the latest current value storage area, the value in which is updated every time the latest current value is detected; and 98-1–98-3 designate a plurality of fault current value storage areas for successively storing the current values when a fault takes place. The controller 91 updates the value in the latest current value storage area 97 in the memory 95 with the current value detected at every predetermined sampling interval. If the current value detected exceeds a predetermined reference value, that is, if a distribution line fault takes place, the controller 91 stores that current value into one of the fault current value storage areas 98-1–98-3 as the fault current value.

In this case, when the fault current is not stored in the fault current value storage area 98-1, the controller 91 stores the fault current into the fault current value storage area 98-1; when the fault current is stored only in the fault current value storage area 98-1, the controller 91 stores the fault current into the fault current value storage area 98-2; and when the fault current is stored in the fault current value storage areas 98-1 and 98-2, the controller 91 stores the fault current into the fault current value storage area 98-3. Thus, three fault current values are stored in the memory 95.

Then, in response to the information transmission request sent from the substation remote terminal unit 70, each of the feeder terminal units 63–69 transmits to the substation remote terminal unit 70 through the communication lines A4 and A5 the values stored in the latest current value storage area 97 and fault current value storage areas 98-1–98-3 of the memory 95 as the information about the associated one of the load break switches 56–61 and tie switch 62.

The substation remote terminal unit 70 thus collects the information about the load break switches 56–61 and tie switch 62, and transfers the information to the control center 71. Thus, the information collecting unit 72 in the control center 71 receives the information. If a distribution line fault takes place, the information that the feeder breaker 54 interrupts because of the distribution line fault is transferred to the computer system 73 in the control center 71. The computer system 73 recognizes the occurrence of the distribution line fault, and identifies the fault section from the values in the fault current value storage areas 98-1–98-3 of the memories 95 stored as the information about the load break switches 56–61 and tie switch 62. Furthermore, the computer system 73 makes a decision as to the scale and progress of the distribution line fault from the values in the fault current value storage areas 98-1–98-3 of the memories 95.

The description of the remaining operation will be omitted here, because it is the same as that of the foregoing embodiment 1. Although each memory 95 includes three fault current value storage areas 98-i in the present embodiment 2, their number is not limited to three but can be made any other number. Alternatively, the controller 91 can set the number in accordance with a command from the computer system 73.

As described above, since the present embodiment 2 stores a plurality of fault current values, it offers an advantage of being able to decide the scale and progress of the distribution line fault from these values, and to improve the reliability in the fault section decision with avoiding the influence of noise.

Embodiment 3

The present embodiment 3 of the distribution control system in accordance with the present invention clears, in response to a clear command fed from the substation remote terminal unit 70 or the like, the fault current value or values stored in the fault current value storage area 98 or areas 98-1–98-3 in the memory 95 of each of the feeder terminal units 63–69. Since the system configuration itself is the same as that of the embodiment 1 or 2, description thereof is omitted here.

Next, the operation of the present embodiment 3 will be described.

Figure 5A:
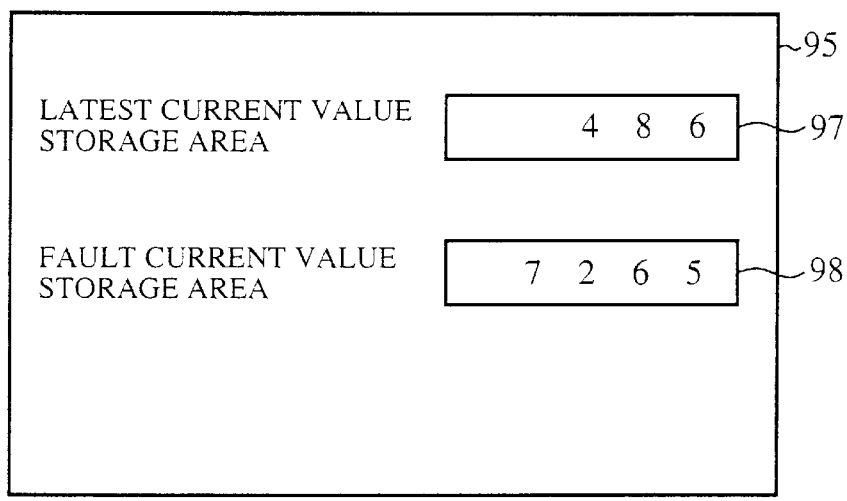
FIGS. 5A and 5B are diagrams illustrating contents stored in the memory before and after a clear operation.
Figure 5B:
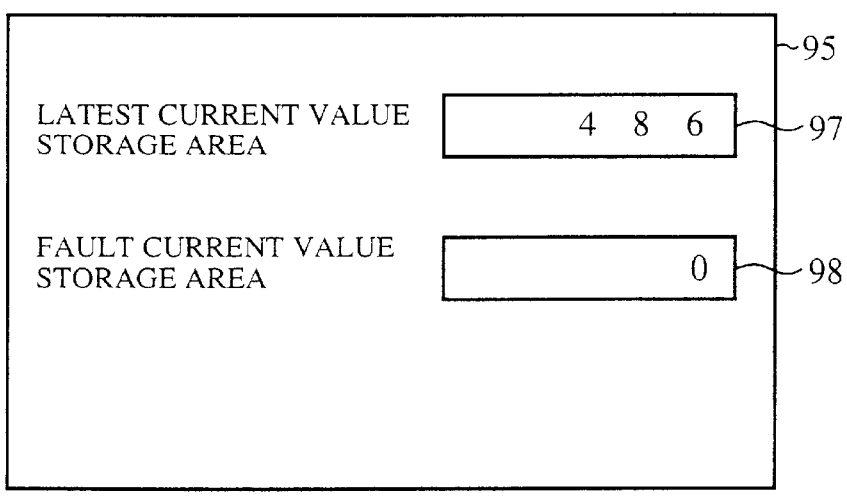

In the present embodiment 3, the substation remote terminal unit 70 or the control center 71 issues the clear command. Receiving the clear command, the controller 91 of each of the feeder terminal units 63–69 clears the value stored in the fault current value storage area 98 of the memory 95 to its initial value. FIGS. 5A and 5B illustrate the contents stored in the memory 95 before and after the clear operation. For example, the value "7265" stored in the fault current value storage area 98 (FIG. 5A) is changed to its initial value "0" (FIG. 5B) in response to the clear command. When each memory 95 includes a plurality of fault current value storage areas 98-i, the values stored in these areas are changed to their initial value in response to the clear command.

Since the remaining operation is the same as that of the embodiment 1 or 2, the description thereof will be omitted here.

As described above, according to the present embodiment 3, the value(s) in the fault current value storage area(s) 98 of each memory 95 is cleared in response to the clear command from the control center 71 or the like. This offers an advantage of being able to clear the value in the fault current value storage area(s) 98 at any desired timing.

Embodiment 4

The present embodiment 4 of the distribution control system in accordance with the present invention clears the fault current value or values stored in the fault current value storage area 98 or areas 98-1–98-3 of the memory 95 in each of the feeder terminal units 63–69 when a predetermined time period elapses.

Figure 6:
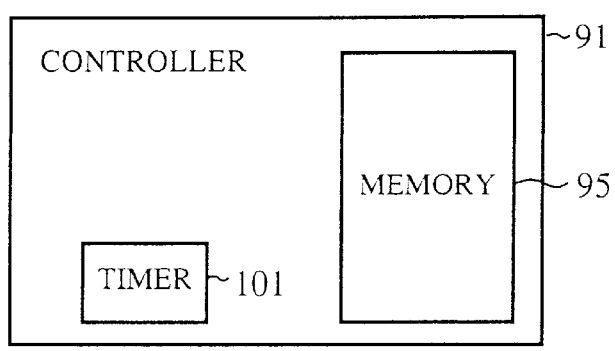
FIG. 6 is a block diagram showing a configuration of a controller in an embodiment 4.
Figure 7:
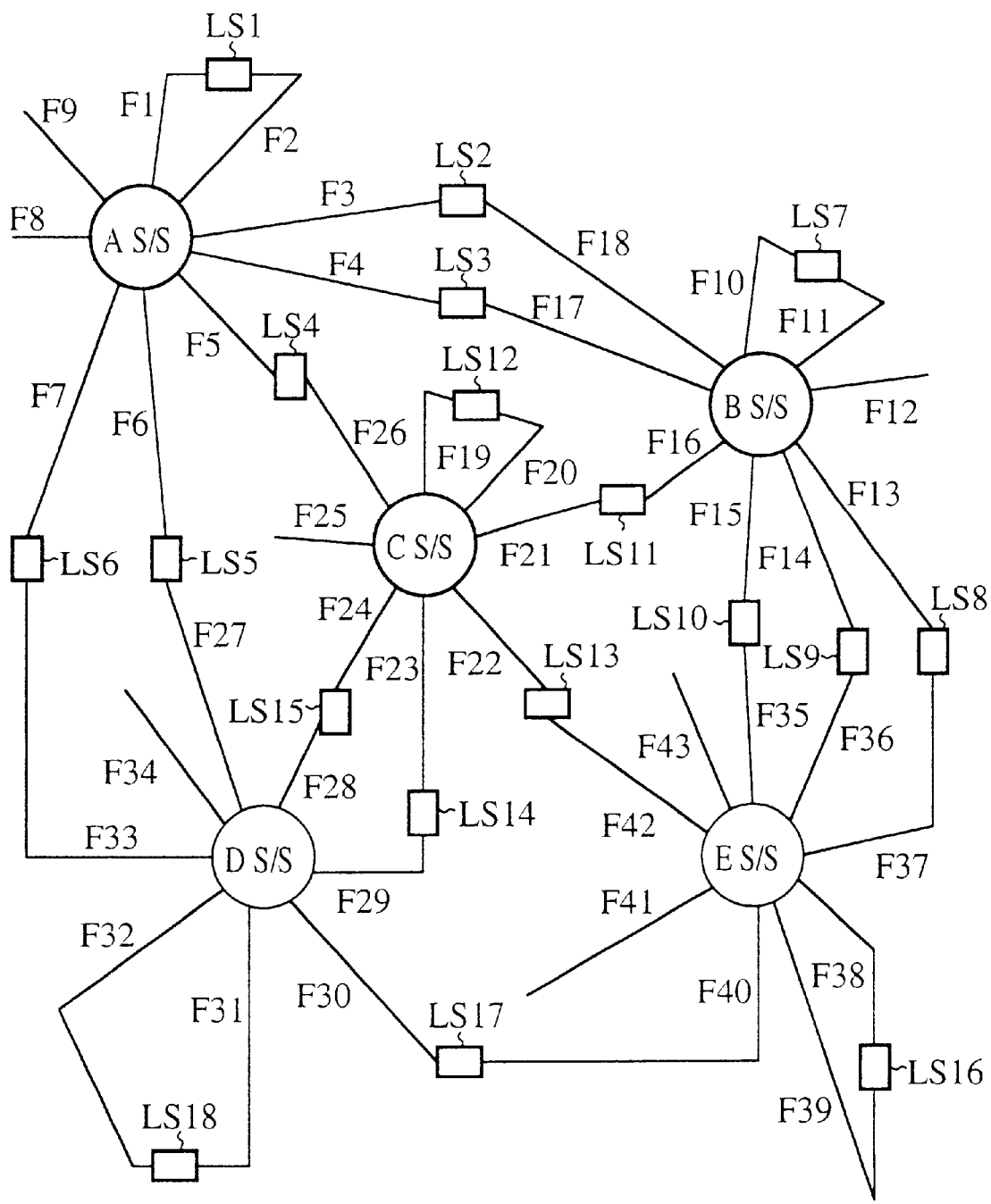
FIG. 7 is a diagram showing an example of a distribution system.
Figure 8:
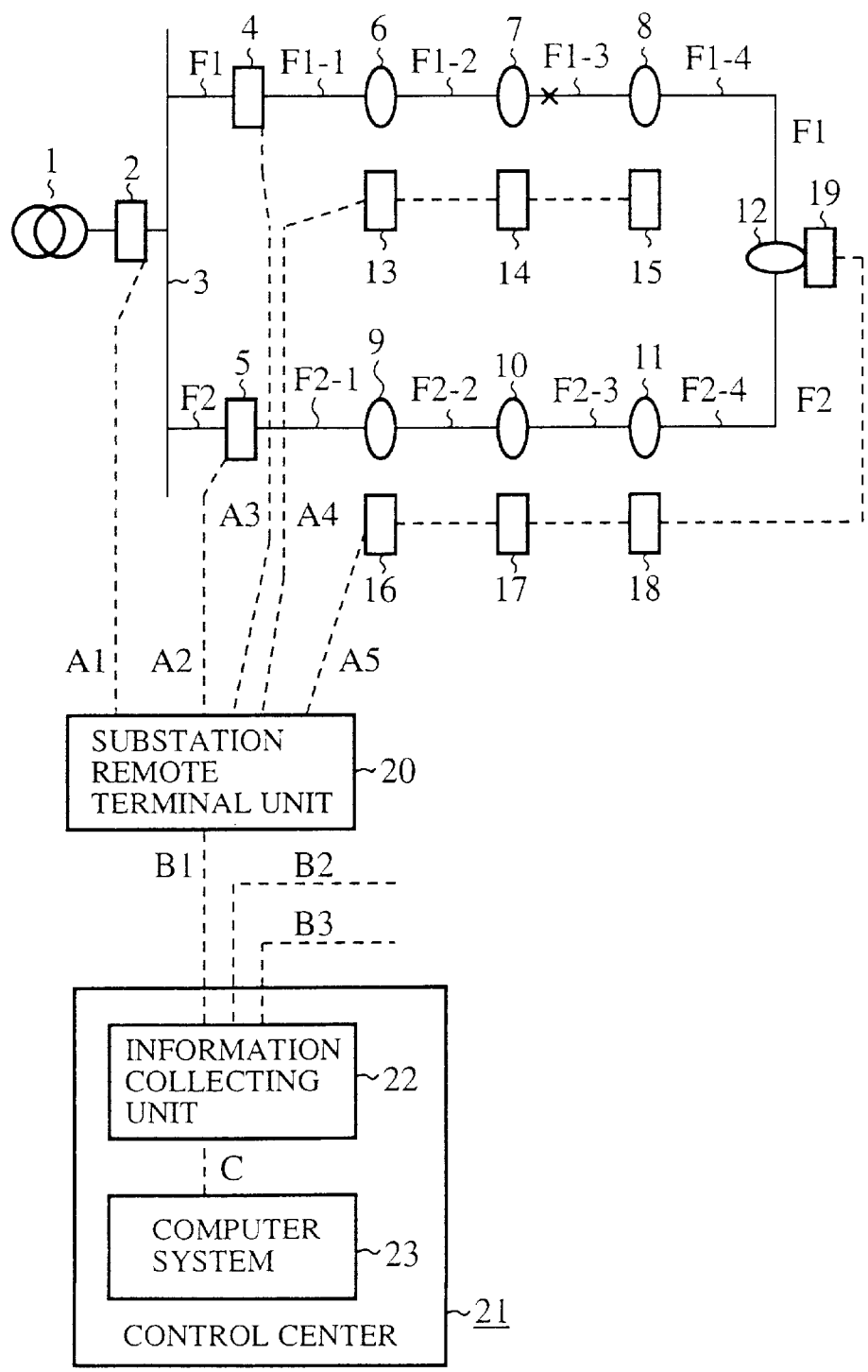
FIG. 8 is a block diagram showing a configuration of a conventional distribution control system.
Figure 9:
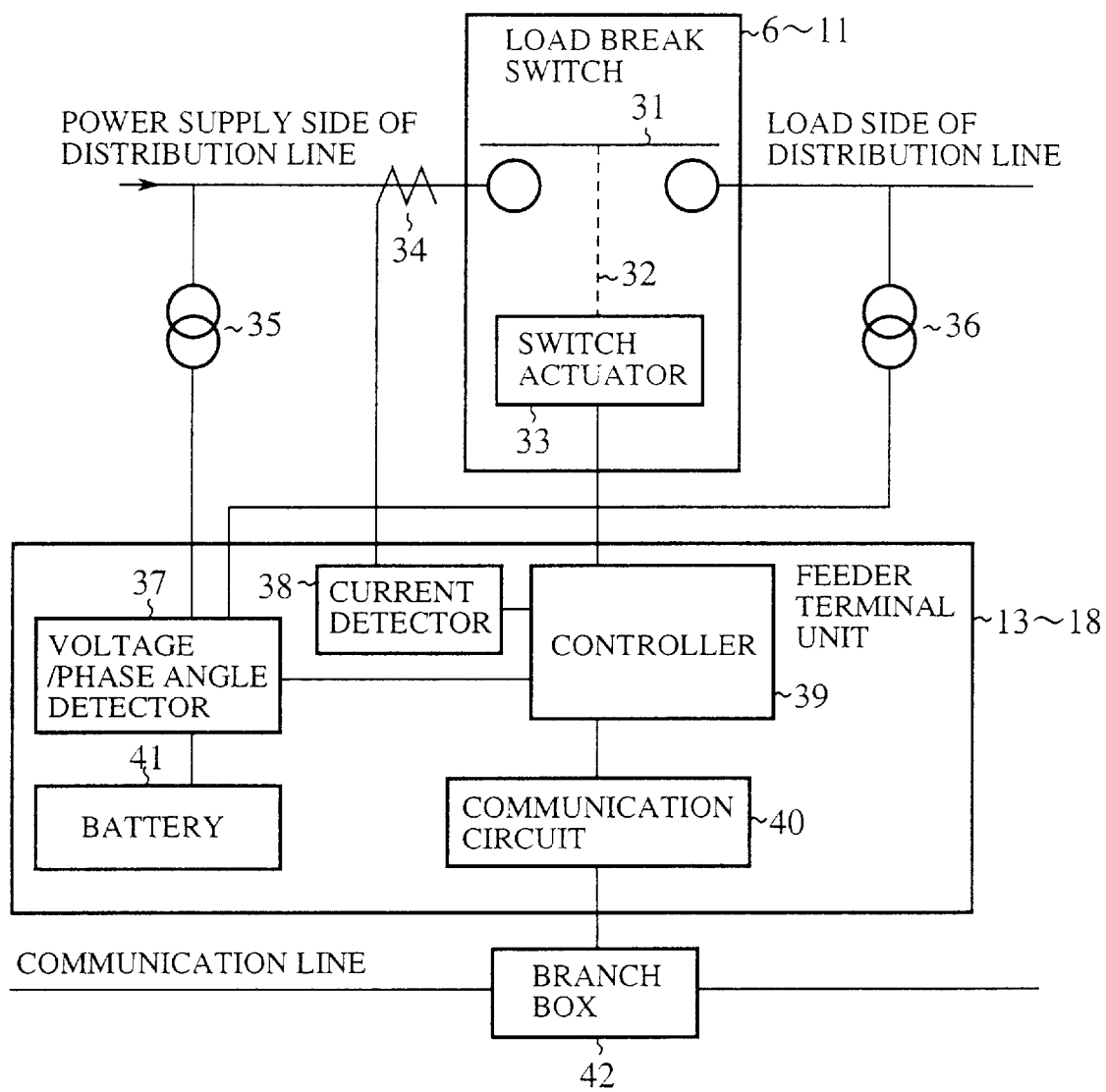
FIG. 9 is a block diagram showing a configuration of a conventional load break switch and feeder terminal unit.

FIG. 6 is a block diagram showing a portion of each controller 91 in the present embodiment 4. In FIG. 6, the reference numeral 91 designates the controller; 95 designates the memory; and 101 designates a timer for counting a time period from the time when the fault current value is stored in the memory 95, and for issuing the clear command when a predetermined time period elapses. Since the remaining configuration of the present embodiment 4 is the same as that of the embodiment 1 or 2, the description thereof will be omitted here.

Next, the operation of the present embodiment 4 will be described.

In the present embodiment 4, the timer 101 begins counting the time period when the controller 91 stores the fault current value into the embedded memory 95, and issues the clear command when the predetermined time has elapsed. In response to the clear command, the controller 91 clears the value stored in the fault current value storage area 98 of the embedded memory 95 to its initial value. When the memory 95 includes the plurality of fault current value storage areas 98-i, the timer 101 starts its counting when the fault current values are stored in all of them, and then their values are changed to their initial values when the predetermined time elapses.

Since the remaining operation of the present embodiment 4 is the same as that of the embodiment 1 or 2, the description thereof is omitted here.

As described above, according to the present embodiment 4, each of the feeder terminal units 63–69 autonomously issues the clear command when the predetermined time has elapsed from the fault, and clears the value(s) in the fault current value storage area(s) 98 of the memory 95 in response to the clear command. This offers an advantage of being able to autonomously clear the value(s) in the fault current value storage area(s) 98 without supplying an external clear command.

Embodiment 5

The present embodiment 5 of the distribution control system in accordance with the present invention identifies, when a distribution line fault takes place, the fault section by collecting the fault current information only from the feeder terminal units located on the load side with respect to the tripped feeder breaker. For example, if a short-circuit fault takes place in the section F1-3 of the distribution line F1 in FIG. 1, the feeder breaker 54 makes a trip, and the information is delivered to the substation remote terminal unit 70. Receiving the information, the substation remote terminal unit 70 transmits the request for the current value information to the feeder terminal units 63–65 located on the load side with respect to the feeder breaker 54. In response to the request, the feeder terminal units 63–65 each transmit to the substation remote terminal unit 70 the information such as the fault current value(s) stored in the memory 95 in the embedded controller 91. The substation remote terminal unit 70 supplies the information to the control center 71, and the computer system 73 in the control center 71 identifies the fault section F1-3 from the fault current values stored in the memory 95 in each of the feeder terminal units 63–65.

Since the remaining configuration and operation of the present embodiment 5 are the same as those of the foregoing embodiment 1 of 2, the description thereof is omitted here.

As described above, the present embodiment 5 identifies the fault section by collecting the fault current information only from the feeder terminal units located on the load side with respect to the tripped feeder breaker. This offers an advantage of being able to identify the fault section with ease.

What is claimed is:

1. A distribution control system for controlling switches, each switch connecting sections of at least one distribution line to a breaker, said distribution control system comprising:

switch controllers, each of said switch controllers controlling an open/close state of one of the switches, and storing, when making a decision that a current passing through the corresponding switch is a fault current, a value of the current as a fault current value; and fault section identifying means for identifying a fault section from the fault current value stored in said switch controllers and generating, at any time selected, a clear command to clear a fault current value stored in said switch controllers, wherein each of said switch controllers clears the fault current value stored in response to the clear command.

2. The distribution control system according to claim 1, wherein each of said switch controllers stores a plurality of fault current values from making a decision that a current passing through the corresponding switch is a fault current for the plurality of fault current values.

3. A distribution control system for controlling switches, each switch connecting sections of at least one distribution line to a breaker, said distribution control system comprising:

switch controllers, each of said switch controllers controlling an open/close state of one of the switches, and storing, when making a decision that a current passing through the corresponding switch is a fault current, a value of the current as a fault current value; and fault section identifying means for identifying a fault section from the fault current value stored in said switch controllers, each of said switch controllers clearing the fault current value after a time period elapses following storing of the fault current value.

4. The distribution control system according to claim 3, wherein each of said switch controllers stores a plurality of fault current values from making a decision that a current passing through the corresponding switch is a fault current for the plurality of fault current values.

5. A distribution control system for controlling switches, each switch connecting sections of at least one distribution line to a breaker, said distribution control system comprising:

switch controllers, each of said switch controllers controlling an open/close state of one of the switches, and storing, when making a decision that a current passing through the corresponding switch is a fault current, a value of the current as a fault current value; and fault section identifying means for identifying a fault section from the fault current value stored in said switch controllers and for identifying, when the breaker trips, the fault section only from fault current values stored in said switch controllers associated with the switches in the distribution line connected to the breaker.

6. The distribution control system according to claim 5, wherein each of said switch controllers stores a plurality of fault current values from making a decision that a current passing through the corresponding switch is a fault current for the plurality of fault current values.

* * * * *